United States Patent [19]

Engels et al.

[11] 4,153,122
[45] May 8, 1979

[54] WEIGHING APPARATUS

[75] Inventors: Mathijs M. J. Engels, Koudekerk aan den Rijn; Albert H. Devoogd, Limburg, both of Netherlands

[73] Assignee: Maatschappij Van Berkel's Patent N.V., Rotterdam, Netherlands

[21] Appl. No.: 803,894

[22] Filed: Jun. 6, 1977

[30] Foreign Application Priority Data

Jun. 10, 1076 [DE] Fed. Rep. of Germany ....... 2626023

[51] Int. Cl.² .................... G01G 19/417; G01G 23/36
[52] U.S. Cl. .............................. 177/25; 177/210 FP;
177/DIG. 3; 364/567
[58] Field of Search ................. 177/210 FP, 25, 1, 50, 177/DIG. 3; 364/567, 466

[56] References Cited

U.S. PATENT DOCUMENTS

| | | | |
|---|---|---|---|
| 3,674,097 | 7/1972 | Gile | 177/25 X |
| 3,770,069 | 11/1973 | Loshbough | 177/25 X |
| 3,860,802 | 1/1975 | Knothe | 177/25 X |

*Primary Examiner*—Joseph W. Hartary
*Attorney, Agent, or Firm*—Lloyd L. Zickert

[57] ABSTRACT

A weighing apparatus having an evaluating device connected to the movement for determining the weight value of a load to be weighed from a series of continuously repeated weight measurements which includes a store or memory for the individual results of the weight measurements and a digital indicating device controlled thereby which shows that particular weight value from the measurement series, for which a certain minimum number of the latest consecutive individual results in the measurement series are the same.

2 Claims, 2 Drawing Figures

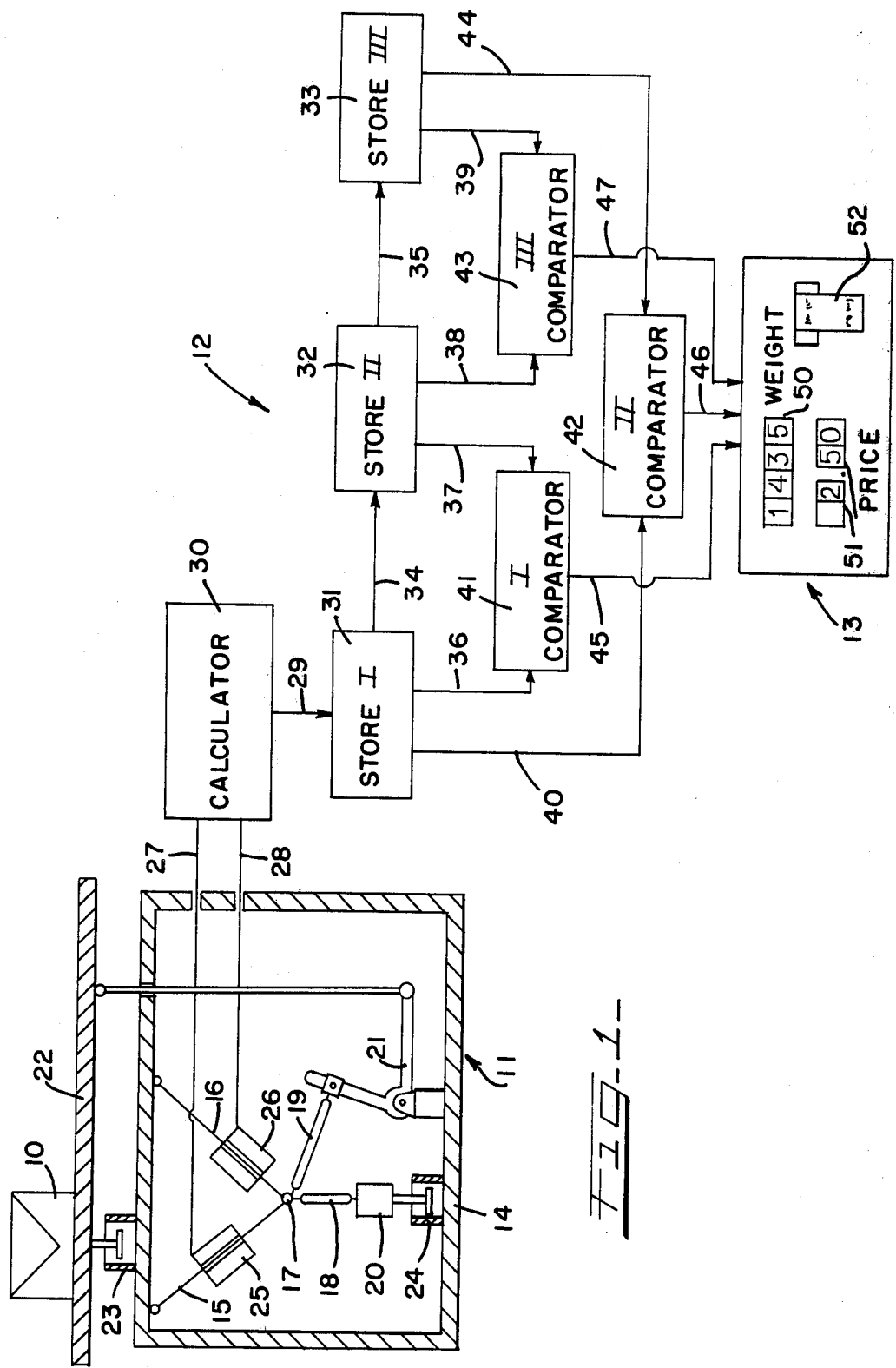

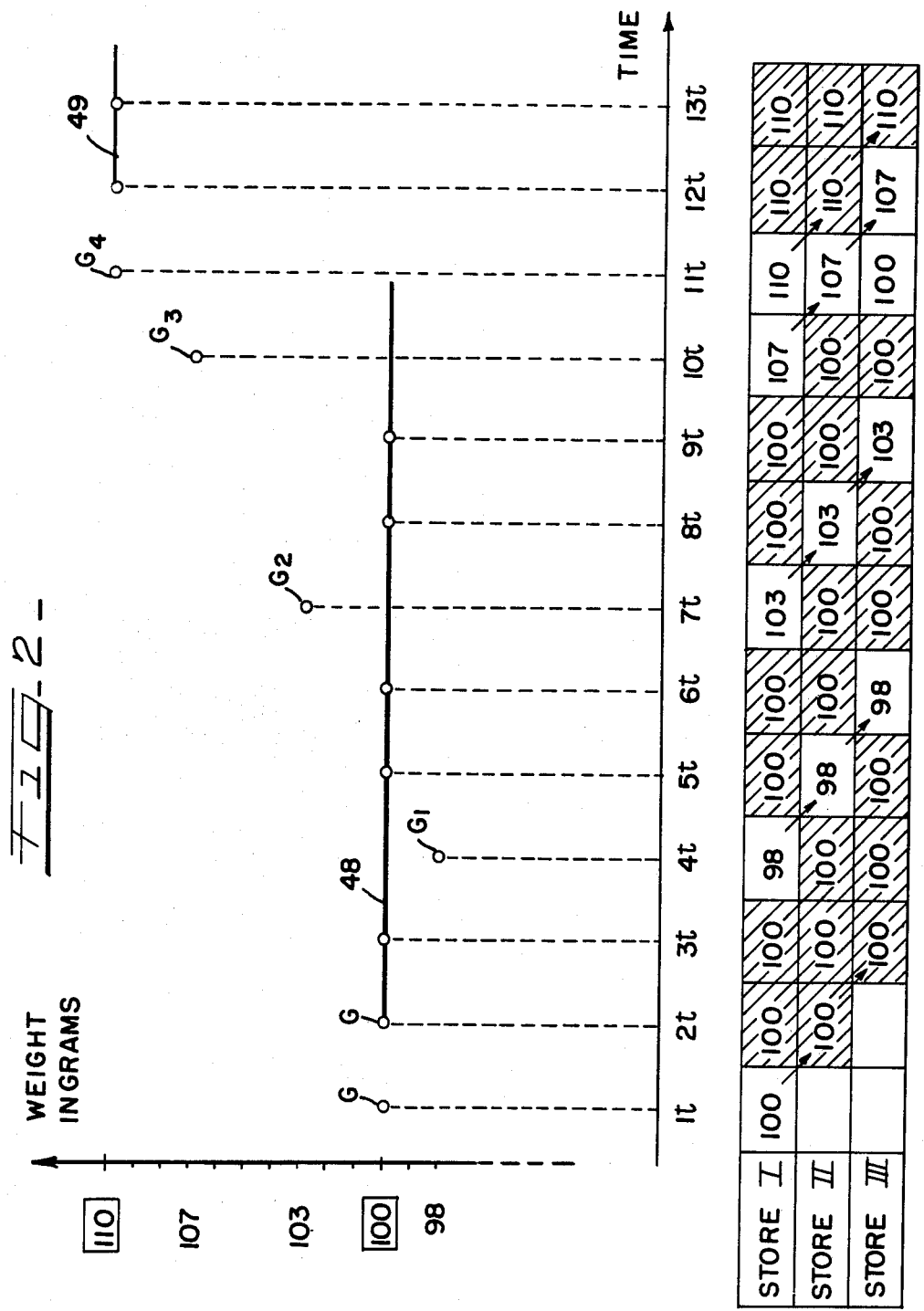

WEIGHING APPARATUS

This invention relates in general to a weighing apparatus, and more particularly to an evaluating device for a weighing apparatus which will compensate for vibrations imparted to the apparatus or the load and which should not be measured as part of the load being weighed.

The disadvantage of known weighing apparatuses is that the indication of weight value is sensitive to disturbances or vibrations. When the weighing apparatus is subject to vibrations coming either from the base or from a load being placed on the scale pan or load receiving platform, a force falsifying the result in imparted to the movement, so that deviations occur in the individual results of the measurement series, which deviations are not caused by the weight of the object being weighed and which cause an inaccurate reading. Accordingly, a predetermined minimum number of the latest consecutive individual results is not reached, and the reading thereof is extinguished even if the disturbance was only temporary and the weight of the load being weighed has remained unaltered thereby. It is then necessary to wait some time until the prescribed minimum number of identical individual results in the measurement series is reached for a reading to be initiated.

The object of the invention is to develop a weighing apparatus of the type indicated above, which is insensitive to disturbances such as vibrations emanating from inside or outside the weighing apparatus, without impairing the sensitivity and accuracy of the apparatus.

This is achieved in accordance with the invention in that the evaluating device does not take into account, for the purpose of the evaluation, any group of consecutive individual results which deviate in value from the weight value retained in the indicator at the time, as long as the said group is numerically smaller than the predetermined minimum number required to change the weight reading.

It is evident from the above that a deviation in the individual results is not automatically suppressed, thus impairing the sensitivity of the weighing apparatus. Such a deviation of the weight value does not immediately affect the weight indication, which could be premature in the deviation concerned was in fact only a disturbance. Only the succeeding individual results in the measurement series will show whether a disturbance has occurred or whether an adjustment to the weight value indication is required on the basis of an actual alteration in weight. If there are then sufficient consecutive individual results giving the changed weight value to match the minimum number required for the weight indication, the preceding individual results which have not affected the indication are fully taken into account and immediately cause a corresponding change to the indication. According to the invention, temporary disturbances to the reading are ignored in principle, while any necessary corrections quickly reflected in the weight value indication are made if they are based on genuine lasting changes in the weight. In this simple manner the apparatus can decide automatically whether any deviation arising in the individual result is a disturbance or not. The apparatus in accordance with the invention thereby works more smoothly without being affected by disturbances and nevertheless responds surprisingly quickly to new situations arising from genuine changes to the weight of the object being weighed.

In the simplest case it is sufficient to limit the minimum number of individual results necessary for a weight indication to two. In this configuration, the apparatus according to the invention is simple in form; it is sufficient for the evaluating device to have three individual series-connected storage locations, each of which accepts one individual result from the measurement series and which are fed consecutively with the latest three individual results of the measurement series. These storage locations are linked in pairs, each pairing linked to one comparator which only transmits the appropriate control command to the indicating device when it registers the fact that the contents of both storage locations linked to it are identical. The mode of operation and further advantages of the invention are illustrated in the drawings and in the description below.

Other objects, features and advantages of the invention will be apparent from the following detailed disclosure, taken in conjunction with the accompanying sheets of drawings, wherein like reference numerals refer to like parts, in which:

FIG. 1 is a schematic illustration of the weighing apparatus according to the invention in its simplest application; and FIG. 2 is a working diagram with a tabular explanation of the operating principle of this weighing apparatus.

The weighing apparatus comprises in general a movement 11, an evaluating device 12 connected to it and receiving weight measuring signals therefrom, and an indicating device 13 controlled by the evaluating device. The movement is of a well known type and arranged in a housing 14, and consists of vibrating strings for weight determination. In the present case, two strings 15, 16 are linked or connected together at one end and attached to the housing 14 at the other end. Two members or links 18, 19 are connected at the above mentioned junction point 17 of the two strings. The member 18 is loaded with a constant reference force, e.g., in the form of a weight 20, whilst the other member 19 is connected to a bar linkage assembly 21 which is activated by the weight to be measured of the commodity placed on a load pan or load receiving platform 22 of the weighing apparatus. The bar linkage assembly 21 produces a measuring force proportional to the weight of the object 10 and which acts proportionately on the two strings 15, 16. Damping means consisting of a piston and cylinder assembly are incorporated both in the bar linkage assembly 21 associated with the measuring force in the form of a damper 23 located between the load pan 22 and the housing 14 and in the linkage assembly 18 for transmitting the reference force in the form of a damper 24 located between the weight 20 and the housing 21.

Combined vibration exciters and sensors 25, 26 produce and measure vibrations of the strings 15, 16. The strings are excited into transverse vibrations, and the amplitudes of the strings are dependent on the magnitude of the reference and measuring forces. The frequency of vibration is received by a calculator 30 which is connected to the vibration sensors 25, 26 through connecting lines 27, 28. Here, in a manner which is in fact already known, a figure corresponding to the actual weight value is recorded from the two frequencies of the strings 15, 16 and is transmitted to the indicating device 13 via the special control elements of the evaluating device 12 shown in FIG. 1.

The evaluating device 12 operates in such a way that a continuous sequence of weight measurements is performed by the apparatus at regular short intervals, e.g., every 0.4 of a second. These short time intervals are designated at a "t" in the working diagram shown in FIG. 2 and plotted along the abscissa of the diagram. These repeated weight measurements produce a series of measurements of a large number of consecutive individual results. The latest of these individual results in each case are retained in the evaluating device 12, which is so arranged that it will only allow a display in the device 13 when a predetermined minimum number of consecutive individual results of the measurement series are identical in value. In the present, simplest case, at least two identical individual results must follow consecutively in such a series of measurements for a display to be produced in device 13.

For this purpose, as shown in FIG. 1, the evaluating device has three storage or memory elements 31, 32, 33 connected in series, which retain the latest three individual results of the measurement series. The first store 31 always receives the latest actual measurement result for storing through feed line 29. Store 31 transfers the preceding individual result stored to the second store 32, through connection 34, so that the second store 32 always contains the second-latest individual result of the measurement series. In the same way, the preceding third-latest individual result of the measurement series is transferred to the third store 33, through connection 35. Any previous individual results are no longer so important for the functioning of the apparatus, so that any further storage locations provided for them are not shown in FIG. 1. In the present case, only the three latest individual results are of any interest.

As can be seen from FIG. 1, each pair of the stores is linked to one comparator 41, 42, 43. Comparator 41 is linked to the two stores 31, 32 through lines 36, 37; comparator 42 is connected to the first and third stores 31, 33 through lines 40, 44; and the third comparator 43 can be seen to be connected with the second and third stores 32, 33 by lines 38, 39. Each of these comparators 41, 42, 43 is connected to the indicating device 13 by information lines 45, 46, 47. The function of the comparators is to insure that the individual result held in the corresponding stores is only transmitted to the indicating device through these information lines when the values stored there are identical. If the values are different, the comparator does not transmit either of the two conflicting pieces of information to the indicating device; in this case, the comparator is impervious to the information.

The operation of the weighing apparatus according to the invention is shown in more detail in FIG. 2, where the unit of indication of the apparatus is in grams. For purposes of greater clarity, only part of the weight scale between 98 and 110 g (grams) has been shown as the ordinate in the diagram of FIG. 2. Along the abscissa, weight measurements are taken at regular time intervals "t," the individual results of which, e.g., at 1t, are shown as circles at each time interval for the weight value "100 g." An arbitrary succession of weights arising from disturbances as well as from placing an additional load on the weighing pan 22 is illustrated in FIG. 2. At each time interval 1t, 2t, 3t, etc., the weight values held in each of the stores or memories 31, 32 and 33 are noted in vertical alignment underneath. In the resulting table, the relevant contents of the stores at the various time intervals "t" are entered in the horizontal line of the respective store, designated with Roman numerals I, II, III in conformity with FIG. 1. Accordingly, each vertical column of the table gives the weight values held in the stores at any particular time interval of measurement. As emphasized by the hatching in the table, only identical weight values are transmitted, as already mentioned above, by the relevant comparators to the indicating unit 13, which then displays the relevant agreed weight value. In the diagram above the table in FIG. 2, the actual display in the indicating device 13 is marked with a solid bold line. The level of the line in relation to the weight scale shows the value on the weight scale which is actually displayed and can be read off at that time interval. The relevant weight indication is designated 48, 49 in the diagram of FIG. 2. A jump in the graph from line 48 to line 49 indicates a change in the actual weight reading. A break in the line at certain time intervals, such as 11t, indicates where a reading is extinguished or not made. The particular reading is also indicated in the above-mentioned table of FIG. 2 by showing the weight values of the individual stores, which are applicable at the relevant time, in hatched boxes. It therefore follows that a clear or unhatched box in the table means that that value has no effect on the display for the time being.

The operation illustrated in FIG. 2 affects the display as follows. The measuring operation begins at 1t, on the assumption that the object 10 being weighed as shown in FIG. 1 has already been on the weighing pan 22 for some time, so that the latter has come to a rest. As indicated by the point of measurement G, at that time interval the weight value "100 g" is measured by the movement and transmitted into store I. As indicated by the diagonal arrow across the junctions of the columns, it can be seen that this content moves first into store II and then to store III at time intervals 2t and 3t respectively. Accordingly, transmission of the content of the store depicted in FIG. 1 through the connecting lines 34, 35 is represented in the table in FIG. 2 by the values moving diagonally between neighboring columns.

At time interval 1t, stores II and III are vacant, as shown in the first column of figures in FIG. 2. The first comparator 41 connected to stores I and II is blocked, as is the second comparator 42 connected to stores I and III, because in each case there are different weight values on their input lines.

At time interval 2t, as already noted, the preceding content has reached store II through line 34, while the new result, on the basis assumed for FIG. 2, also shows the weight value "100 g", as indicated by the point of measurement G. Now, as shown by the hatchings in this column of figures, there are identical results in stores I and II, so that a corresponding control pulse is transmitted by the comparator I through its information line 45 to the indicating device 13, which registers the appropriate value "100 g." Similarly, it is assumed that the individual result of the weight measurement has remained unchanged at time interval 3t. As shown in the corresponding column of figures in the table in FIG. 2, there are now identical weight values of "100 g" in all three stores, so that all three comparators 41, 42, 43 shown in FIG. 1 uniformly transmit the same information "100 g" to the indicating device 13, setting the latter accordingly.

At time interval 4t it is assumed that an external disturbance, e.g., vibration of the weighing apparatus, gives rise to acceleration forces which distort the real weight value, as shown by the point of measurement G, in FIG. 2, which should indicate a value of only "98 g." This value does appear in store I, but cannot affect the display in the device 13 because this value will not be allowed to pass through the first comparator 41 nor through the second comparator 42 because of the absence of agreement between the associated stores. The only identical weight values "100 g" coming from stores II and III through the third comparator 43 by information line 47 will be registered at the indicating device 13. As indicated by the hatchings in the corresponding column of figures in the table and by the unbroken indication line 48 at this point, the indicating device continues to display the same weight value "100 g" at time interval 4t. This continues unchanged through the subsequent indications at time intervals 5t and 6t, where the disturbance is still held numerically in the stores, but has no definitive effect because of the operation of the first and third stores at time interval 5t by the second comparator 42 and the first and second stores at time interval 6t by the first comparator 41.

The measurement $G_2$ caused by a disturbance as illustrated at time interval 7t, indicating the false value 103, is similarly ignored right through to the weight measurement at time interval 9t, whereafter this false measurement finally disappears from the stores. Throughout this period as well, the hatchings of the relevant definitive weight values in the table and the unbroken line 48 in the diagram show that the display at the indication unit, unaffected by these measurements $G_1$ and $G_2$, indicates the weight value "100 g."

As shown in FIG. 2, it is assumed at time interval 10t that the weight of the object 10 being weighed on the weighing pan is being increased, e.g., by putting an additional slice of sausage onto a weighing apparatus in a butcher's shop. At this time interval of measurement the relevant components of the apparatus have not yet come to rest and there is an "internal disturbance" within the apparatus which, as shown by the point of measurement $G_3$ in the diagram, results in the incorrect measurement "107 g." At this time interval, the apparatus still displays the preceding, definitive weight value 100 g, because of the identical stores II and III. The apparatus only comes to rest again at time interval 11t where the first correct weight value "110" for the increased weight is received, as indicated by the point of measurement $G_4$.

As shown in the corresponding column of figures, all the stores contain different values, so that the display is interrupted at this point because none of the comparators 41, 42, 43 will allow a result to pass through to the indicating device. The relevant numerical values are therefore shown in the table in unhatched boxes and the indication line 48 is interrupted at this point.

Only at time interval 12t, when store I and II contain identical individual results, a control command "110 g" is transmitted to the indicating device 13 by the first comparator 41. As indicated by the line 49 drawn in the diagram at this level, the display now continues. On the basis that a condition for first registering a measurement is that there must be two identical consecutive individual results in the measurement series, this is the earliest possible time interval for a reading to become effective.

As shown in FIG. 1, the indicating device 13 operates digitally. In the present case, the weight value appropriate to the object 10 being weighed is indicated in the associated display window 50. The device 13 also incorporates a price calculator, the price value of which, not shown in more detail, corresponding to a particular unit of weight, e.g., 1 kg, can be set in a manner which is already known, depending on the nature of the commodity 10 to be handled. The price calculator determines the total price corresponding to the relevant weight value G and displays the price digitally in an appropriate display window 51. The indicating device 13 can also incorporate a printer or a photo-electric copier for recording the preset fixed values such as date of packing, price per kilogram or unit of weight, type of goods, etc., on the one hand and the data calculated from the individual weight of the object being weighed, such as weight value and total price, on the other hand, on a record carrier or paper tape 52. This record carrier 52 can also be attached to the commodity 10 after it has been weighed, in the form of an adhesive label.

The invention is not limited merely to the embodiment illustrated, where the weight display is based on two identical weight values in the measurement series. Three or more individual results could be used for establishing a weight indication, in which case it would merely be necessary to multiply the circuit accordingly. In such a case it would be possible to compensate several consecutive weight deviations resulting from a disturbance without disrupting the display based on the actual weight. Further, the apparatus could be used for a price indication instead of a weight indication, because the denomination and nature of the scales are unimportant. It would be equally conceivable to use the invention not only for weighing apparatuses but also for other measuring instruments where simple, automatic elimination of disturbances during the measuring process is desired.

It will be understood that modifications and variations may be effected without departing from the scope of the novel concepts of the present invention, but it is understood that this application is to be limited only by the scope of the appended claims.

The invention is hereby claimed as follows:

1. A weighing apparatus having a movement for producing a weight value signal, an evaluating device connected to the movement for receiving the signal, and a digital indicating device connected to and controlled by the evaluating device for digitally indicating a weight measurement, said evaluating device including means for producing a continuous sequence of weight value signals at regular short intervals, at least three series-connected storage elements the first one of which receives the latest weight value signal and the others of which receive in consecutive order the next previous weight value signal, and a plurality of comparators of equal number to the number of storage elements each of which include a pair of inputs connected to a different pair of said storage elements and an output connected to said indicating device, each said comparator transmitting the content of the storage elements connected thereto to the indicating device only if the weight value signals from said storage elements are identical, whereby said evaluating device will prevent transmission to the indicating device any group of consecutive weight value signals which differ from the weight measurement in the indicating device so long as the group is numerically smaller than a predetermined minimum number required to change the weight measurement.

2. In a weighing apparatus having a movement for generating a weight measurement signal in response to the weight of an article being weighed, an evaluating device receiving the weight measurement signal from the movement and producing a weight measurement signal free from vibrations to the movement, and an indicating device receiving the weight measurement signal from the evaluating device, the improvement in said evaluating device which includes first, second and third stores connected in series with the first store being connected to the movement, means transmitting at regular short intervals the weight measurement signal from the movement to the first store and consecutively to the second and third stores, first, second and third comparators each of which includes an output connected to the indicating device and a pair of inputs connected to outputs of a pair of said stores, and each comparator transmitting a weight measurement signal to the indicating device only if the signals from the stores connected thereto are identical, whereby said evaluating device prevents transmission to the indicating device any weight measurement signal differing from two consecutive identical weight measurement signals.

* * * * *